(12) United States Patent
Kishimoto et al.

(10) Patent No.: US 12,330,356 B2
(45) Date of Patent: Jun. 17, 2025

(54) METHOD AND MOLD FOR MANUFACTURING REACTOR

(71) Applicant: TOYOTA JIDOSHA KABUSHIKI KAISHA, Toyota (JP)

(72) Inventors: Shun Kishimoto, Miyoshi (JP); Ryo Yokozawa, Nisshin (JP); Mitsuyasu Higano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 18/063,783

(22) Filed: Dec. 9, 2022

(65) Prior Publication Data

US 2023/0219267 A1    Jul. 13, 2023

(30) Foreign Application Priority Data

Jan. 13, 2022  (JP) ................................ 2022-003798

(51) Int. Cl.
   *B29C 45/27*     (2006.01)
   *B29C 45/14*     (2006.01)
   *H01F 41/00*     (2006.01)

(52) U.S. Cl.
   CPC .... *B29C 45/2708* (2013.01); *B29C 45/14639* (2013.01); *H01F 41/005* (2013.01)

(58) Field of Classification Search
   None
   See application file for complete search history.

(56) References Cited

FOREIGN PATENT DOCUMENTS

| JP | 2019145697 A | * | 8/2019 | ............. H01F 37/00 |
|----|--------------|---|--------|-------------------------|
| JP | 2019-165061 A |  | 9/2019 | |

* cited by examiner

*Primary Examiner* — Michael M. Robinson
(74) *Attorney, Agent, or Firm* — Oblon, McClelland, Maier & Neustadt, L.L.P.

(57) ABSTRACT

To prevent a core from being damaged. A method for manufacturing a reactor includes a step of assembling a core that is configured of a core center part and a pair of core leg parts extending outwardly from the core center part to a coil in such a way that the core center part is inserted into a hollow part of the coil and the coil is sandwiched between the core center part and the pair of the core leg parts; and a step of performing resin molding by disposing the coil and the core that are assembled inside a mold and pouring resin into the mold from a gate provided on the mold to the side which is closer to the coil than the core legs parts are while having an outer surface of each of the core leg parts supported by a support part provided on the mold.

5 Claims, 6 Drawing Sheets

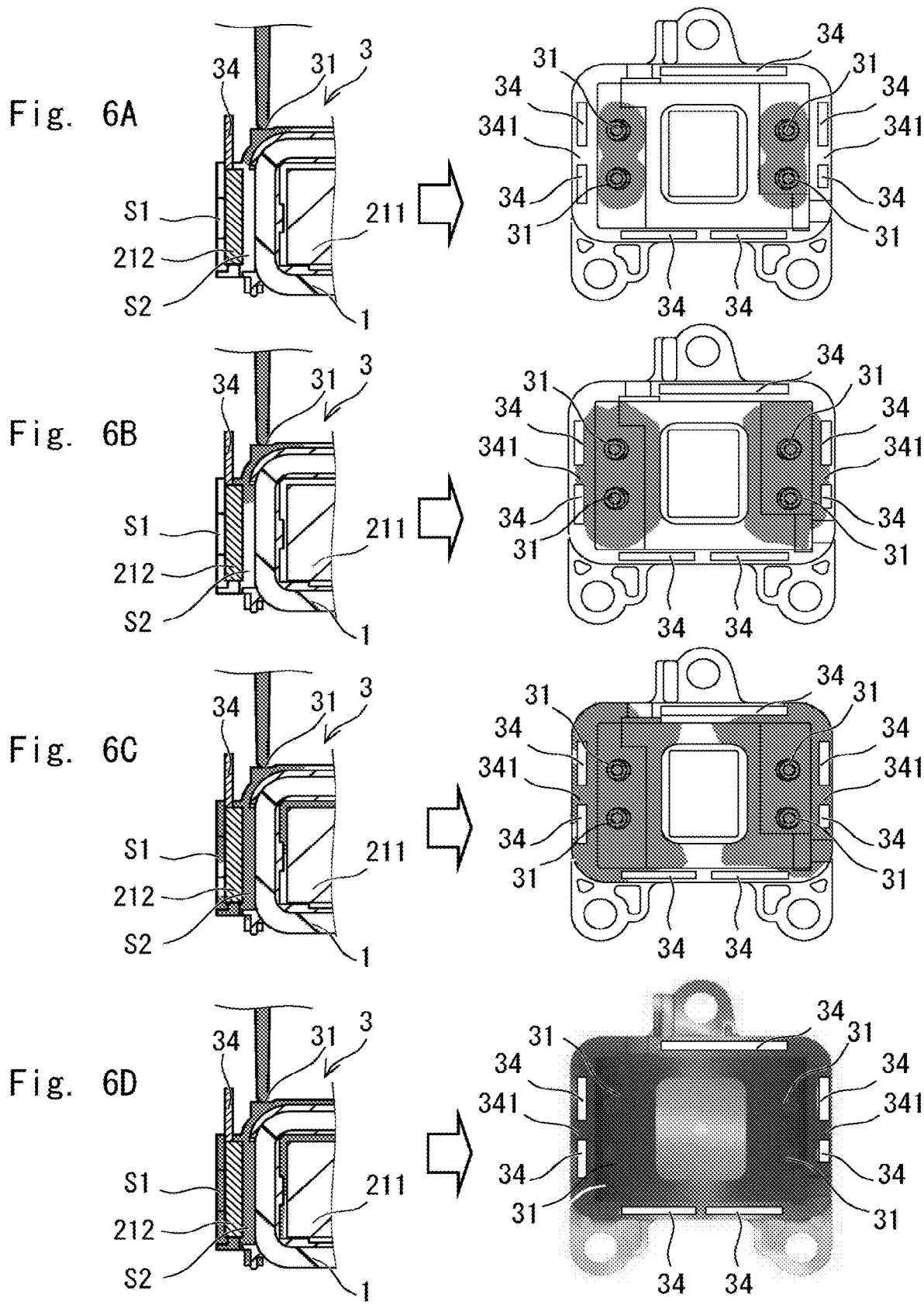

METHOD AND MOLD FOR MANUFACTURING REACTOR

CROSS REFERENCE TO RELATED APPLICATIONS

This application is based upon and claims the benefit of priority from Japanese patent application No. 2022-003798, filed on Jan. 13, 2022, the disclosure of which is incorporated herein in its entirety by reference.

BACKGROUND

The present disclosure relates to a method and mold for manufacturing a reactor.

A method for manufacturing a reactor is known (e.g. Japanese Unexamined Patent Application Publication No. 2019-165061), which includes a step of assembling a core that is configured of a core center part and a pair of core leg parts extending outwardly from the core center part to a coil in such a way that the core center part is inserted into a hollow part of the coil and the coil is sandwiched between the core center part and the pair of the core leg parts and a step of performing resin molding by disposing the coil and the core that are assembled inside a mold and pouring resin from a gate into the mold.

SUMMARY

For the purpose of reducing the size of a reactor, thinning of the core legs is performed. In this case, conventionally, when gates are provided on the mold on the core leg parts thereof, the length of a path in which resin flows from the gates is longer in an inner peripheral flow channel formed on the inner side of each of the core leg parts than in an outer peripheral flow channel formed on the outer side of each of the core leg parts. In this configuration, since the amount of resin that flows through the outer peripheral flow channel formed on the outer side of each of the core leg parts is greater than the amount of resin that flows through the inner peripheral flow channel formed on the inner side of each of the core leg parts at the initial stage of resin injection, pressure is imposed on each of the core leg parts from the outer side thereof towards the inner side thereof. Further, each of the core leg parts is not supported from the inner side thereof. Therefore, due to the pressure imposed on the core leg parts by the resin flowing through the outer peripheral flow channel, the core leg parts may collapse inward and deform, which may cause damage to the core leg parts.

The present disclosure has been made in view of the problem mentioned above and an object of the present disclosure is to provide a method and mold for manufacturing a reactor that can prevent a core from being damaged.

A first exemplary aspect of the present disclosure is a method for manufacturing a reactor, including:
- a step of assembling a core that is configured of a core center part and a pair of core leg parts extending outwardly from the core center part to a coil in such a way that the core center part is inserted into a hollow part of the coil and the coil is sandwiched between the core center part and the pair of the core leg parts; and
- a step of performing resin molding by disposing the coil and the core that are assembled inside a mold and pouring resin into the mold from a gate provided on the mold to the side which is closer to the coil than the core legs parts are while having an outer surface of each of the core leg parts supported by a support part provided on the mold.

In the first exemplary aspect, an outer peripheral flow channel through which the resin flows may be formed between the outer surface of each of the core leg parts and an inner surface of the mold and the an inner peripheral flow channel through which the resin flows may be formed between an inner peripheral surface of each of the core leg parts and an outer peripheral surface of the coil, and the mold may have a blocking part that comes in contact with an upper end surface of a gate side of each of the core leg parts and may block resin from flowing from the gate to the outer peripheral flow channel.

In the first exemplary aspect, the gate may be located on an inner side of the mold with respect to the inner peripheral flow channel.

In the first exemplary aspect, the resin poured from the gate may flow through the inner peripheral flow channel, through a channel formed between a lower end surface of the core leg part opposite an upper end surface of the core leg part and the mold, and into the outer peripheral flow channel.

In the first exemplary aspect, a distance from the gate to an inner surface of the blocking part may be greater than a distance from an outer surface of the blocking part to an outer surface of the outer peripheral flow channel.

In the first exemplary aspect, the core may be divided into a pair of core structural components formed in a roughly E-shape in cross-section, the core center part may be made to pass through the hollow part of the coil by disposing the pair of the core structural components in such a way that end surfaces of the core structural components face each other, and the core center part and the core leg parts may be disposed so as to surround the coil whose one side faces the other side due to the location of the core center part and the core leg parts, and the blocking part may have a gap formed therein at a position corresponding to a position where the end surfaces of the core structural components face each other, and a part of the resin that is poured from the gate may flow through the gap and into the outer peripheral channel.

Another exemplary aspect of the present disclosure is a mold in which a core and a coil are disposed in an assembled state, the core being configured of a core center part and a pair of core leg parts extending outwardly from the core center part and assembled to the coil in such a way that the coil is sandwiched between the core leg parts and the core center part, the mold including:
- a support part that supports an outer surface of each of the core leg parts; and
- a gate provided on the mold to the side which is closer to the coil than the core leg parts are and from which resin is poured into the mold.

According to the present disclosure, it is possible to provide a method and mold for manufacturing a reactor that can prevent a core from being damaged.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 6A is a diagram showing a resin flow process inside the mold;

FIG. 6B is a diagram showing a resin flow process inside the mold;

FIG. 6C is a diagram showing a resin flow process inside the mold; and

FIG. 6D is a diagram showing a resin flow process inside the mold.

DESCRIPTION OF EMBODIMENTS

Hereinbelow, embodiments of the present disclosure will be described with reference to the drawings. A method for manufacturing a reactor according to this embodiment is a method for manufacturing a reactor to be applied to converters. Converters are, for example, installed in vehicles provided with electric motors such as battery electric vehicles and hybrid electric vehicles, and supply power to the electric motors by boosting the battery voltage and supplying it to the electric motors.

Figure 1:
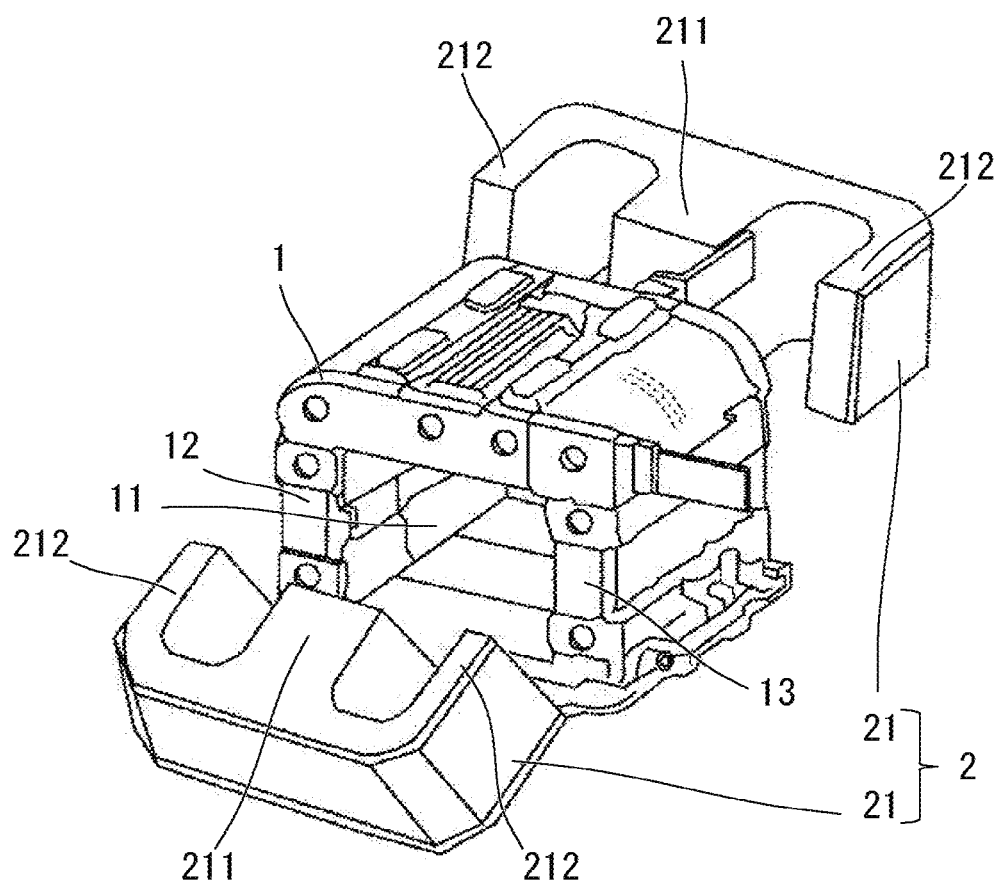
FIG. 1 is a diagram showing a state in which a core is assembled to a coil.

In the method for manufacturing a reactor according to this embodiment, after a core 2 is assembled to a coil 1 as shown in FIG. 1, insert molding is performed on the coil 1 and the core 2 disposed inside the mold using resin for molding so that a predetermined shape having a flange or the like for attachment purpose is formed to the coil 1 and the core 2.

Next, the method for manufacturing a reactor according to this embodiment will be described in detail. First, a flat wire is wound around in such a way that a hollow part 11 is formed, and the coil 1 is fabricated. Next, the coil 1 is disposed inside the mold and coil molding is performed on the coil 1 using resin so that the coil 1 is molded into a predetermined shape. By performing the aforementioned coil molding, the surface of the coil 1, including the inner peripheral surface of the hollow part 11 of the coil 1 but excluding the terminal end of the coil 1, is coated with resin.

Instead of performing coil molding, for example, an insulating component such a bobbin may be interposed between the coil 1 and the core 2. Note that coil molding is preferable in that the number of structural components can be reduced.

Next, the core 2 is assembled to the coil 1 that has been coil-molded. The core 2 is composed of a magnetic material. The core 2 is divided into a pair of core structural components 21 formed in a roughly E-shape in cross-section. Each of the core structural components 21 of the core 2 has a core center part 211 and a pair of core leg parts 212 extending outwardly from the core center part 211.

The core 2 is assembled to the coil 1 in such a way that the core center part 211 of the core 2 is inserted into the hollow part 11 and the coil 1 is sandwiched between the core center part 211 and the core leg parts 212. To be more specific, the core center part 211 is made to pass through the hollow part 11 by disposing the pair of the core structural components 21 in such a way that the end surfaces of the core structural components 21 face each other. Accordingly, the core center part 211 and the core leg parts 212 are disposed so as to surround the two sides of the coil 1, that is, the one side 12 and the other side 13 of the coil 1 facing each other. The end surfaces of the pair of the core structural components 21 may be bonded with each other with an UV-curable adhesive.

Next, the coil 1 to which the core 2 is assembled through curing of an adhesive is disposed inside the mold for shaping it into a predetermined shape. The coil 1 and the core 2 are resin-molded by pouring resin inside the mold. The mold is composed of, for example, an upper die and a lower die.

Figure 2:
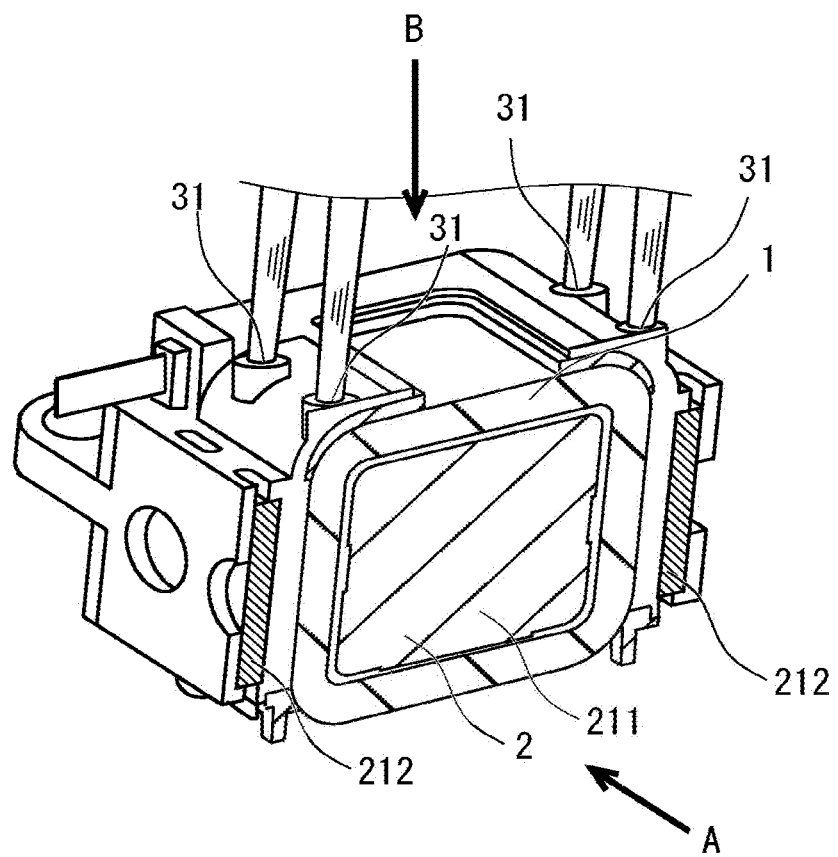
FIG. 2 is a cross-sectional diagram showing a path of flow of resin in a mold under a state in which a coil and a core are disposed inside a mold.
Figure 3:
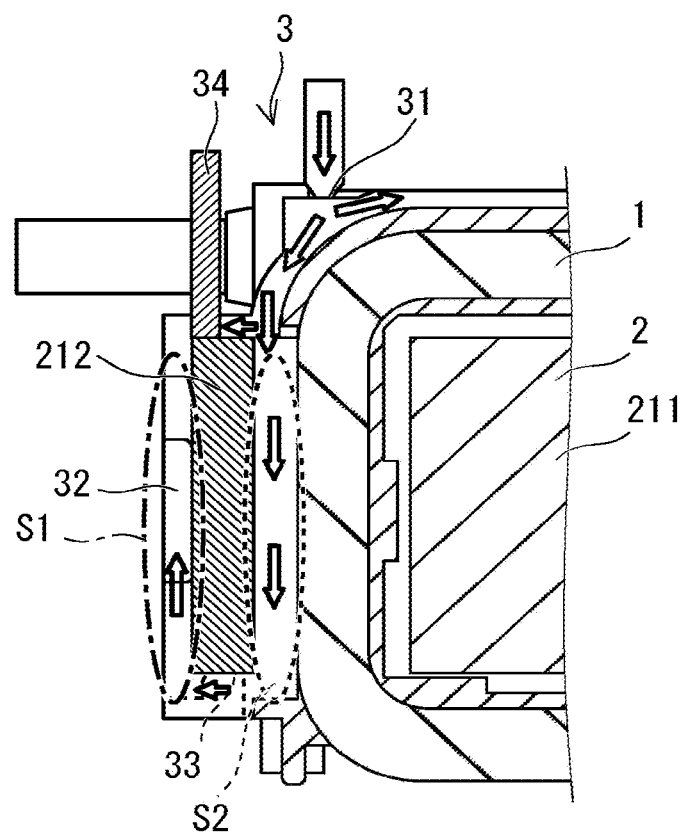
FIG. 3 is a cross-sectional diagram of the coil and the core shown in FIG. 2 as viewed in direction A (a front view)

FIG. 2 is a cross-sectional diagram showing a path of flow of resin in the mold under a state in which the coil and the core are disposed inside the mold. The path of flow of resin corresponds to the area where resin is molded. FIG. 3 is a cross-sectional diagram of the coil and the core shown in FIG. 2 as viewed in direction A (a front view). The mold is present outside of the flow channel illustrated in FIGS. 2 and 3. Further, in FIG. 2, for the sake of simplification, only the left-hand side of the coil 1 and the core 2 are shown, and illustration of the right-hand side of the coil 1 and the core 2 is omitted.

A mold 3 has a gate 31 through which resin is poured into the mold 3. In the example shown in FIG. 2, the mold 3 has four gates 31, but the number of the gates is not limited to four. The number of the gates 31 provided on the mold 3 may be any number, and may be set in view of the injection force of resin and the like.

As shown in FIG. 3, an outer peripheral flow channel S1 through which resin flows is formed between the outer surface of the core leg parts 212 and the inner surface of the mold 3. An inner peripheral flow channel S2 through which resin flows is formed between the inner surface of the core leg parts 212 and the outer surface of the coil 1.

The gate 31 is provided on the mold to the side which is closer to the coil than the core leg parts 212 are. It is desirable to provide the gate 31 on the mold in such a way that is it located on the inner side of the mold (i.e. closer to the coil) with respect to the inner peripheral flow channel S2, as shown in FIG. 3. By this configuration, it is possible to make more resin flow to the inner peripheral flow channel S2 side at the initial stage of resin injection. Note that the location of the gate 31 shown in FIG. 3 is only an example and is not be limited thereto. The gate 31 may be provided on the mold at any location as long as it is located on the mold to the side which is closer to the coil than the coil leg parts 212 are.

The mold 3 is provided with an outer side support part 32 that comes in contact with the outer surface of each of the core leg parts 212 and supports the outer surface of each of the core leg parts 212. Further, the mold 3 is provided with a lower end support part 33 that comes in contact with the lower end surface of each of the core leg parts 212 and supports the lower end surface of each of the core leg parts 212. The outer side support part 32 and the lower end support part 33 may be formed integrally with the mold 3.

Incidentally, for the purpose of reducing the size of a reactor, the core leg parts are thinned. In this case, conventionally, when a gate is provided on the mold on the core leg part side of each of the core leg parts, the length of a path in which resin flows from the gate is longer in an inner peripheral flow channel formed on the inner side of each of the core leg parts than in an outer peripheral flow channel formed on the outer side of each of the core leg parts. In this configuration, since the amount of resin that flows through the outer peripheral flow channel formed on the outer side of each of the core leg parts is greater than the amount of resin that flows through the inner peripheral flow channel formed on the inner side of each of the core leg parts at the initial stage of resin injection, pressure is imposed on each of the core leg parts from the outer side thereof towards the inner side thereof. Further, each of the core leg parts are not supported from the inner side thereof. Therefore, due to the pressure imposed on the core leg parts by the resin flowing through the outer peripheral flow channel, the core leg parts may collapse inward and deform, which may cause damage to the core leg parts.

On the other hand, in the method for manufacturing a reactor according to this embodiment, the coil 1 and the core 2 are molded with resin by pouring resin into the mold 3 from the gate 31 provided on the mold 3 to the side which is closer to the coil than the core leg parts 212 are while having the outer surface of each of the core leg parts 212 supported by the outer side support part 32 provided on the mold 3.

Since the gate 31 is provided on the coil side of mold, the length of a path in which resin flows from the gate 31 is longer in the outer peripheral flow channel S1 formed on the outer side of each of the core leg parts 212 than in the inner peripheral flow channel S2 formed on the inner side of each of the core leg parts 212. In this configuration, since the amount of resin that flows through the inner peripheral flow channel S2 formed on the inner side of each of the core leg parts 212 is greater than the amount of resin that flows through the outer peripheral flow channel S1 formed on the outer side of each of the core leg parts 212 at the initial stage of resin injection, pressure is imposed on each of the core leg parts 212 from the inner side thereof towards the outer side thereof. Meanwhile, the outer surface of each of the core leg parts 212 is supported by the outer side support part 32 of the mold 3. In this configuration, each of the core leg parts 212 does not collapse outward and deform, whereby it is possible to prevent the core 2 from being damaged.

Further, in this embodiment, it is desirable to provide, to the mold 3, a blocking part 34 that comes in contact with the upper end surface of the gate 31 side of the core leg part 212 and blocks resin from flowing from the gate 31 to the outer peripheral flow channel S1. The blocking part 34 is configured of, for example, a rectangular plate-like member.

The blocking part 34 may be formed integrally with the mold 3. Further, the blocking part 34 is slidable in the vertical direction of the mold 3 and may be pressed toward the core leg parts 212 through a spring member or the like. By this configuration, it is possible to absorb variations in the dimensions of the core 2 and bring the tip end of the blocking part 34 and the upper end surface of the core leg part 212 in tight contact with each other, whereby it is possible to block resin from flowing into the outer peripheral channel S1 without fail.

The resin poured from the gate 31 is blocked from flowing into the outer peripheral flow channel S1 by the blocking part 34 and thus instead flows through the inner peripheral flow channel S2. Then, the resin flows through the flow channel formed between the lower end surface of the core leg part 212 and the mold 3 and flows into the outer peripheral flow channel S1. By this configuration, the length of the resin flow path from the gate 31 is longer in the outer peripheral flow channel S1 than in the inner peripheral flow S2 channel formed in the core leg parts 212. In this configuration, since the amount of resin that flows through the inner peripheral flow channel S2 formed on the inner side of each of the core leg parts 212 is greater than the amount of resin that flows through the outer peripheral flow channel S1 formed on the outer side of each of the core leg parts 212 at the initial stage of resin injection, pressure is imposed on each of the core leg parts 212 from the inner side thereof towards the outer side thereof. However, the outer surface of each of the core leg parts 212 is supported by the outer side support part 32 of the mold 3. In this configuration, it is possible to suppress the core leg part 212 from collapsing outward and deforming, whereby it is possible to prevent the core 2 from being damaged.

The distance from the gate 31 to the inner surface of the blocking part 34 is greater than the distance from the outer surface of the blocking part 34 to the outer surface of the outer peripheral flow channel S1. In this configuration, the flow channel for the inner peripheral flow channel S2 is made larger than that for the outer peripheral flow channel S1 so that more resin can be made to flow to the inner peripheral flow channel S2 than to the outer peripheral flow channel S2. Note that it is desirable that the blocking part 34 is located as far outward as possible while it is in contact with the upper end surface of each of the core leg parts 212. By this configuration, it is possible to make resin flow to the inner peripheral channel S2 side as described above.

Figure 4:
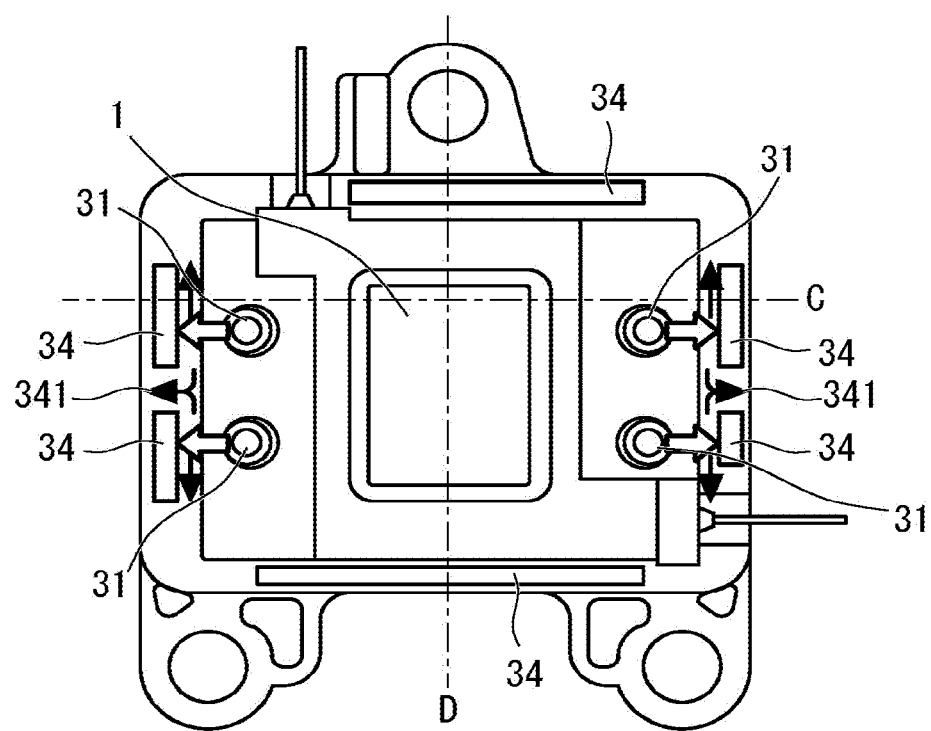
FIG. 4 is a top view of the coil and the core shown in FIG. 2 as viewed from the above (in direction B)

FIG. 4 is a top view of the coil and the core shown in FIG. 2 as viewed from the above (in direction B). As shown in FIG. 4, the blocking part 34 is provided at four locations of the mold 3, respectively. Note that the blocking part 34 may have a gap 341 formed therein at a position corresponding to a position where the end surfaces of the core structural components 21 face each other.

As described above, most of the resin poured into the mold from the gate 31 is blocked from flowing to the outer peripheral channel S1 by the blocking part 34 and instead flows through the inner peripheral channel S2. On the other hand, a part of the resin that is poured from the gate 31 flows through the gap 341 and flows into the outer peripheral channel S1. By this configuration, resin molding can be performed on the bonded part where the end surfaces the core component 21 face each other.

Figure 5:
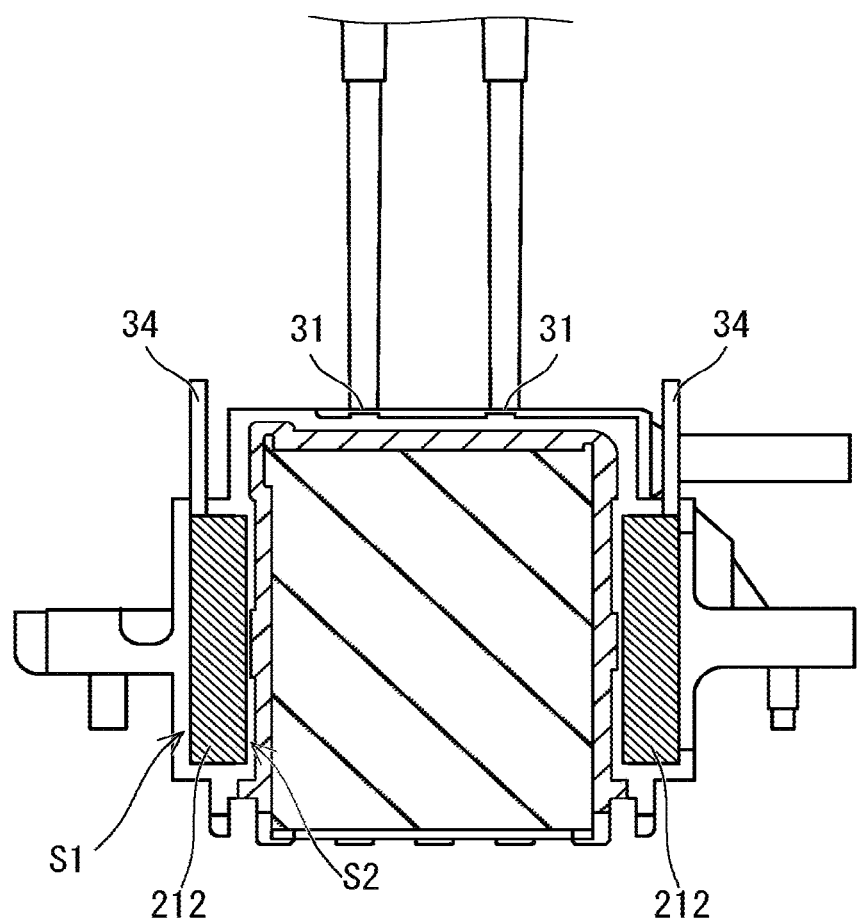
FIG. 5 is a cross-sectional diagram of FIG. 4 cut along the line D.

FIG. 5 is a cross-sectional diagram of FIG. 4 cut along the line D. Note that the FIG. 3 is a cross-sectional diagram of FIG. 4 cut along the line C. In the cross-sectional diagram shown in FIG. 5, like in the cross-sectional diagram shown in FIG. 3, the gate 31, the blocking part 34, the core center part 211, the core leg part 212, the inner peripheral channel S2, and the outer peripheral channel S1 are provided to the mold.

The outer peripheral flow channel S1 through which resin flows is formed between the outer surface of core leg part 212 and the inner surface of the mold 3. The inner peripheral flow channel S2 through which resin flows is formed between the inner surface of core leg part 212 and the outer surface of the coil 1. The gate 31 is provided on the mold in such a way that it is located on the inner side of the mold (i.e. closer to the coil) with respect to the inner peripheral flow channel S2. The blocking part 34 comes in contact with the upper end surface of the gate 31 side of the core leg part 212 and blocks the resin from flowing from the gate 31 to the outer peripheral channel S1.

The resin that is poured from the gate 31 is blocked from flowing into the outer peripheral flow channel S1 by the blocking part 34 and flows to the inner peripheral flow channel S2. Then, the resin flows through the channel formed between the lower end surface of the core leg part 212 and the mold 3 into the outer peripheral channel S1. By this configuration, the length of the resin flow path from the gate 31 is longer in the outer peripheral flow channel S1 than in the inner peripheral flow S2 channel formed in the core leg parts 212. In this configuration, since the amount of resin that flows through the inner peripheral flow channel S2 formed on the inner side of each of the core leg parts 212 is greater than the amount of resin that flows through the outer peripheral flow channel S1 formed on the outer side each of the core leg parts 212 at the initial stage of resin injection, pressure is imposed on each of the core leg parts 212 from the inner side thereof towards the outer side thereof. However, the outer surface of each of the core leg parts 212 is supported by the outer side support part 32 of the mold 3. In this configuration, it is possible to suppress the core leg part 212 from collapsing outward and deforming, whereby it is possible to prevent the core 2 from being damaged.

Next, a resin flow process inside the mold 3 is described in further detail with reference to FIG. 6. First, as shown in FIG. 6A, resin is poured into the mold 3 from the gate 31. Next, as shown in FIG. 6B, some of the resin poured into the mold from the gate reaches the blocking part 34 and is blocked from entering into the outer peripheral channel S1 by the blocking part 34. The rest of the resin poured into the mold from gate flows into the peripheral flow channel S2.

Further, as shown in FIG. 6C, the resin flows through the inner peripheral flow channel S2, flows between the flow channel disposed between the lower end surface of the core leg part 212 and the mold 3, and flows into the outer peripheral channel S1. On the other hand, a part of the resin that is blocked from flowing into the outer peripheral flow channel S1 by the blocking part 34 flows through the gap 341 and flows into the outer peripheral flow channel S1.

As shown in FIG. 6D, after the inner peripheral flow channel S2 is filled up with resin, the outer peripheral flow channel S1 is also filled up with resin with a time lag.

As described above, in the method for manufacturing a reactor according to this embodiment, the coil 1 and the core 2 are molded with resin by pouring resin into the mold 3 from the gate 31 provided on the mold 3 to the side which is closer to the coil than the core leg parts 212 are while having the outer surface of each of the core leg parts 212 supported by the outer side support part 32 provided on the mold 3.

Since the gate 31 is provided on the coil side of the mold, the length of the resin flow path from the gate 31 is longer for the outer peripheral flow channel S1 formed on the outer side of the core leg parts 212 than for the inner peripheral flow channel S2 formed on the inner side of the core leg parts 212. In this configuration, since the amount of resin that flows through the inner peripheral flow channel S2 formed on the inner side of the core leg parts 212 is greater than the amount of resin that flows through the outer peripheral flow channel S1 formed on the outer side of each of the core leg parts 212 at the initial stage of resin injection, pressure is imposed on each of the core leg parts 212 from the inner side thereof towards the outer side thereof. However, the outer surface of each of the core leg parts 212 is supported by the outer side support part 32 of the mold 3. In this configuration, each of the core leg parts 212 does not collapse outward and deform, whereby it is possible to prevent the core 2 from being damaged.

Further, it is desirable to provide, to the mold 3, the blocking part 34 that comes in contact with the upper end surface of the gate 31 side of each of the core leg parts 212 and blocks resin from flowing from the gate 31 to the outer peripheral flow channel S1.

The resin poured from the gate 31 is blocked from flowing into the outer peripheral flow channel S1 by the blocking part 34 and flows through the inner peripheral flow channel S2. Then, the resin flows through the flow channel formed between the lower end surface of the core leg part 212 and the mold 3 and flows into the outer peripheral flow channel S1. By this configuration, the length of the resin flow path from the gate 31 is longer for the outer peripheral flow channel S1 than for the inner peripheral flow S2 channel formed in the core leg parts 212. In this configuration, pressure is imposed on the core leg parts 212 from the inner side thereof towards the outer side thereof, but the outer surface of each of the core leg parts 212 is supported by the outer side support part 32 of the mold 3. In this configuration, it is possible to suppress the core leg part 212 from collapsing outward and deforming, whereby it is possible to prevent the core 2 from being damaged.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method for manufacturing a reactor, comprising:
   assembling a core that is configured of a core center part and a pair of core leg parts extending outwardly from the core center part to a coil in such a way that the core center part is inserted into a hollow part of the coil and the coil is sandwiched between the core center part and the pair of the core leg parts; and
   performing resin molding by disposing the coil and the core that are assembled inside a mold and pouring resin into the mold from a gate provided on the mold to the side which is closer to the coil than the core legs parts are while having an outer surface of each of the core leg parts supported by a support part provided on the mold, wherein
   an outer peripheral flow channel through which the resin flows is formed between the outer surface of each of the core leg parts and an inner surface of the mold and an inner peripheral flow channel through which the resin flows is formed between an inner peripheral surface of each of the core leg parts and an outer peripheral surface of the coil, and
   the mold has a blocking part that comes in contact with an upper end surface of a gate side of each of the core leg parts and blocks resin from flowing from the gate to the outer peripheral flow channel.

2. The method for manufacturing the reactor according to claim 1, wherein the gate is located on an inner side of the mold with respect to the inner peripheral flow channel.

3. The method for manufacturing the reactor according to claim 1, wherein the resin poured from the gate flows through the inner peripheral flow channel, through a channel formed between a lower end surface of the core leg part opposite an upper end surface of the core leg part and the mold, and into the outer peripheral flow channel.

4. The method for manufacturing the reactor according to claim 1, wherein a distance from the gate to an inner surface of the blocking part is greater than a distance from an outer surface of the blocking part to an outer surface of the outer peripheral flow channel.

5. The method for manufacturing the reactor according to claim 1, wherein
   the core is divided into a pair of core structural components formed in a roughly E-shape in cross-section,
   the core center part is made to pass through the hollow part of the coil by disposing the pair of the core structural components in such a way that end surfaces of the core structural components face each other, and
   the core center part and the core leg parts are disposed so as to surround the coil whose one side faces the other side due to the location of the core center part and the core leg parts, and the blocking part has a gap formed therein at a position corresponding to a position where the end surfaces of the core structural components face each other, and a part of the resin that is poured from the gate flows through the gap and into the outer peripheral channel.

* * * * *